US006773793B2

(12) United States Patent
Flynn et al.

(10) Patent No.: US 6,773,793 B2
(45) Date of Patent: Aug. 10, 2004

(54) GLASS FLAKE PAPER

(75) Inventors: Ronald T. Flynn, Blacklick, OH (US); Darryl A. Payne, Granville, OH (US); Ralph E. Brandon, Newark, OH (US)

(73) Assignee: Electrolock, Inc., Hiram, OH (US)

( * ) Notice: Subject to any disclaimer, the term of this patent is extended or adjusted under 35 U.S.C. 154(b) by 78 days.

(21) Appl. No.: 10/154,499

(22) Filed: May 24, 2002

(65) Prior Publication Data

US 2003/0219581 A1 Nov. 27, 2003

(51) Int. Cl.[7] .............................. B32B 25/02; D21J 1/00

(52) U.S. Cl. .................... 428/221; 428/293.4; 428/323; 428/325; 162/100; 162/156

(58) Field of Search ................................. 162/100, 156; 428/221, 323, 325, 293.4, 295, 297, 301, 302

(56) References Cited

U.S. PATENT DOCUMENTS

| | | | | | |
|---|---|---|---|---|---|
| 3,005,745 | A | | 10/1961 | Holmes | |
| 3,066,065 | A | | 11/1962 | Koerner et al. | |
| 3,131,114 | A | * | 4/1964 | Heyman | 428/338 |
| 3,225,131 | A | | 12/1965 | Conklin et al. | |
| 3,298,882 | A | | 1/1967 | Waugh et al. | |
| 3,560,320 | A | * | 2/1971 | LeHeron | 428/312.6 |
| 3,633,140 | A | | 1/1972 | Lake et al. | |
| 3,723,797 | A | | 3/1973 | Andersson et al. | |
| 4,498,957 | A | * | 2/1985 | Sasaki et al. | 162/146 |
| 5,691,058 | A | * | 11/1997 | Miyao et al. | 428/379 |
| 5,723,568 | A | | 3/1998 | Shimada et al. | |

FOREIGN PATENT DOCUMENTS

| | | | | |
|---|---|---|---|---|
| EP | 662746 A1 | * | 7/1995 | H02K/15/10 |

OTHER PUBLICATIONS

M.P. Koerner, "Glass Flake in Flexible Composite Insulations", 1958, 13 pages.

Article "Glass–Flake Paper" by L.M. Conklin, Electrical Manufacturing, Jun. 1958.

* cited by examiner

*Primary Examiner*—Cynthia Kelly
*Assistant Examiner*—J. M. Gray
(74) *Attorney, Agent, or Firm*—Pearne & Gordon LLP

(57) ABSTRACT

An electrical insulating sheet is disclosed. The sheet includes 50–99% D glass flakes and 1–50% additives. Optional ingredients include a bonding agent, porosity control agent, and reinforcing agent(s) to enhance tensile strength.

32 Claims, No Drawings

GLASS FLAKE PAPER

FIELD OF THE INVENTION

The present invention relates to a sheet material for electrical insulation, and, more specifically, relates to a sheet material for electrical insulation suitable for an electrical coil to be used where a high dielectric strength insulation is required.

BACKGROUND OF THE INVENTION

Insulated electrical coils for conventional electrical machines have been produced for many years with an electrical insulation tape made of a glass cloth bonded to a laminated mica paper. This tape is wound around a coil conductor and is typically impregnated with a thermosetting resin and cured. In the alternative, the tape may be a semi-cured (e.g. "b-stage") prepregnated tape which is wound around the coil and then cured.

The dielectric strength of such conventional tapes is mainly derived from the mica, and the mechanical strength of the tape is largely due to the glass cloth. However, because of the dielectric strength of such conventional tapes, they have not always proved satisfactory.

It would be advantageous, therefore, to produce a sheet material for electrical insulation combining similar mechanical strength and improved dielectric strength.

SUMMARY OF INVENTION

In accordance with one aspect, the present invention provides an electrically insulating sheet material composed primarily of D-glass flake. The sheet material includes about 50–99% D-glass flakes and about 1–50% additives such as bonding agents, reinforcing agents, and porosity control agents.

DESCRIPTION OF EXAMPLE EMBODIMENTS

As used herein and in the claims, all percentages are given as weight percentages unless otherwise indicated. As used herein and in the claims, all weight percentages are percentages of the total weight of the electrical sheet material. As used herein, when a preferred range such as 5–25 is given, this means preferably at least 5% and, separately and independently, preferably not more than 25% of that component are used.

D-glass flake has an intrinsic dielectric strength 25 to 35% higher than mica and therefore will provide superior performance as an insulating sheet. Unlike mica, however, glass flake has no self-bonding characteristics. As a result, additive components must be used in the D-glass flake insulating sheet to provide for the physical integrity of the sheet during manufacture and use. The additives contributions include, but are not limited to: 1) improved retention of the glass flake during manufacture, 2) improved wet handling of the glass flake sheet during manufacture, 3) porosity control, 4) bonding of the glass flake into the insulating sheet for improved dry flake retention and sheet strength, and 5) reinforcement of the insulating sheet for improved physical strength.

The present invention embodies two forms which are similar but distinct. The first form of the invention is an insulating sheet in which the majority of the physical strength is provided by a fabric or unidirectional continuous reinforcing yarns. In the second form of the invention, the reinforcement is provided by discrete fibers intermingled with the glass flake, referred to herein as an "un-backed" insulating sheet.

The electrical insulating sheet material of the present invention has the following preferred formulations or tables of components, depending on whether it is the reinforced or the "un-backed" form. In these formulations or tables of components, any preferred or less preferred weight percent or weight percent range of any component can be combined with any preferred or less preferred weight percent or weight percent range of any of the other components; it is not required or necessary that all or any of the weight percents or weight percent range come from the same column. Note however, that the weight percentage of components other than D-glass must equal at least one percent.

TABLE OF COMPONENTS FOR A BACKED INSULATING SHEET (EXCLUDING CONTINUOUS REINFORCING YARNS)

| | WEIGHT PERCENTS | | |
|---|---|---|---|
| | Less Preferred | Less Preferred | Preferred |
| D-Glass | 50–99 | 70–95 | 80–95 |
| Retention Aid/Porosity Control Agent | 0–45 | 0–10 | 0–3 |
| Bonding Agent | 0–30 | 5–17 | 5–12 |
| Discrete Fiber | 0–20 | 0–7 | 0–5 |

TABLE OF COMPONENTS FOR A UN-BACKED INSULATING SHEET

| | WEIGHT PERCENTS | | |
|---|---|---|---|
| | Less Preferred | Less Preferred | Preferred |
| D-Glass | 50–99 | 70–95 | 80–90 |
| Retention Aid/Porosity Control Agent | 0–45 | 0–10 | 0–3 |
| Bonding Agent | 0–30 | 5–25 | 5–15 |
| Discrete Fiber | 0–20 | 5–15 | 7–12 |

The additives used in D-glass flake insulating sheet according to the invention constitute the following broad categories:

retention aids porosity control agents bonding agents reinforcements

In some cases, an additive may fit in more than one category.

Retention aids help capture the finer flake particles during the wet-forming of the insulating sheet. They also help retain the flake by mechanical entrapment in the dry, finished sheet. Examples of retention aids are fibrids, flocs or synthetic pulps.

Porosity control agents disrupt the planarity of glass flake particles creating channels for the absorption of saturating resins. It should be understood that the porosity of the insulating sheet needs to be controlled in that too porous of a structure could lead to voids in the finished electrical component while too closed of a structure will be hard to saturate. Porosity control agents need to be thermally stable to the conditions used during manufacture and saturation of the insulating sheets. Examples of porosity control agents are fibrids and cylindrical fine fiber flocs produced from continuous fiber filaments.

Bonding agents are used to bond the glass flake together and to provide improved mechanical strength to the insulating sheet. The bonding agent can be either a thermoplastic or thermoset resin. The thermoplastic can be solid fusible particle, fiber, floc or an aqueous dispersion of a thermoplastic resin. It is important that the thermoplastic bonding agent needs to flow and bond at lower temperatures and pressures than the materials used as porosity control agents and reinforcing agents. Thermoset bonding agents will be aqueous dispersions of the uncured resin or a particulate b-staged form of the resin. Examples of thermoplastic bonding agents are low softening point flocs or binder fibers such as polyolefin floc. Examples of thermoset bonding agents are aqueous dispersions of epoxy or urethane resins.

Reinforcements can be of two types. The first type encompasses fabrics and continuous yarns which can be incorporated into the insulating sheet during sheet manufacture or as a post manufacture lamination step. These fabrics and yarns run continuously along the length of the insulating sheet. As with the porosity control agents, reinforcing agents need to be thermally stable, i.e. not stretch or shrink, under the thermal conditions encountered during manufacture or application of the insulating sheet. Some examples of scrims and continuous yarns that can be are polyaramid, E-glass, D-glass, polyimide, and polyester.

The second type of reinforcement is the use of discrete, dispersible fibers which form a random array within the insulating sheet and are bonded into the insulating sheet by a bonding agent. Examples of suitable discrete fibers are polyaramid, E-glass, D-glass, polyester, and nylon.

An embodiment of the invention is an electrical insulating sheet material (or "glass flake paper") the primary component of which is D-glass flake. D-glass, as is known in the art, is a boro silicate glass having approximately the following composition in weight percent:

| | |
|---|---|
| $SiO_2$ | 72–75% |
| CaO | 0–1% |
| $Na_2O$, $K_2O$, and $Li_2O$ | 1–4% |
| $B_2O_3$ | 21–25% |

D-glass has superior dielectric strength compared to other silicate glasses, which is important in an insulating sheet material. D-glass is commercially available in a yarn form from at least one supplier.

The D-glass flakes may be produced in several ways, for example a melt drawing process. In melt drawing, the D-glass raw materials are heated to a temperature of 2650° F., at which point the molten D-glass exhibits a viscosity of approximately 750 poise. The molten glass is then extruded from the melting apparatus and mechanically attenuated to form a long thin tube. By adjusting the rate of extrusion and speed of attenuation, the thickness of the tube walls can be controlled. The thickness of the tube walls corresponds to the thickness of the glass flakes produced in the process. This thickness should be between 2–12 microns, tending more generally between 3–10 microns, ideally between 4–7 microns. The tube is broken off as it cools and separates from the attenuation device. Subsequently, the pieces of the glass tube are ground, for example, in a ball mill. The ground flakes generally are put through a series of vibratory screens to obtain flakes of the desired particle size distribution. The preferred diameter of the flakes is typically 50–250 microns.

In one example, the insulating sheet material according to the invention further comprises retention/porosity control agents in the form of fibrids, such as poly [1,3-phenylene isophthalamide] fibrids. Poly [1,3-phenylene isophthalamide] fibrids are available under the trade name Nomex® from DuPont. Fibrids generally refer to particles of material in which one of the dimensions is several orders of magnitude smaller than the other two dimensions. A fibrid is thus similar to a flake. Suitable fibrids have a thickness of approximately 1–10 micrometers, with a width and length each of approximately 100–1000 micrometers. While Nomex® fibrids are suitable for use in an embodiment of the invention, other fibrids having dielectric strength as good as or better than D-glass, i.e. <3.6 dielectric constant of D-glass [measured at 21° C. and 106 Hz], may be used, provided that they are thermostable at the conditions used during manufacture and fabrication of the insulating sheet, e.g. 150° to 250° F. and 40 to 80 psi typical of the hot calendaring conditions of temperature and pressure required to fuse the thermoplastic resin when a polyolefin is used as a bonding compound (as set forth below).

In another example, the insulating sheet material according to the invention further comprises retention/porosity control agents in the form of floc, such as the polyaramid Poly [1,4-phenylene isophthalamide] floc. Poly [1,4-phehylene isophthalamide] flocs are available under the trade name Kevlar® from DuPont. In this context, flocs refer to fine, split or branched fibers or micro fibers (fibrils) similar in appearance to fibrulated wood pulp. While Kevlar® floc is suitable for use in an embodiment of the invention, other flocs having similar high dielectric properties may be used, provided that they are thermostable at typical hot calendaring conditions (e.g. 40 to 80 psi, 150 to 250° F.) of temperature and pressure required to fuse the thermoplastic resin used as a bonding compound (as set forth below).

The use of the above fibrids and/or flocs in addition to the glass flakes enhances the porosity and wetting characteristics of the final product, helps to retain the glass flakes during manufacture by collecting and holding D-glass flakes, and increases the wet strength of the unbonded sheet through mechanical interlocking or entanglement to reduce tearing during processing prior to the final bonding step. Finally, the fibrids and/or floc enhance the mechanical strength of the finished electrical insulating sheet material without unduly compromising its dielectric strength.

The insulating sheet material according to the invention may further comprise a bonding agent, typically a thermoplastic and/or thermoset resin. A thermoplastic resin may be introduced into the sheet in the form of a floc such as polypropylene or polyethylene. Floc is made up of fine fibrils that are nonlinear and contain splits and/or branches. The floc fibrils, which act as a retention aid in addition to being a bonding agent, must be fine enough to provide even distribution and uniform bonding when the sheet is calendared. Other thermoplastic resins may be used, provided that they have a flow temperature sufficiently lower than the temperature at which the porosity control agents melt or degrade.

Thermoset bonding agents can also be used as a bonding agent. Typically, the same epoxy saturants used in mica based insulating sheets can be used either as aqueous dispersions applied to the wet formed sheet and then dried to the "b-stage" or else applied as non-aqueous systems to the previously dried glass flake paper and then cured to the b-stage. It is preferred, but not required, that the b-stage curing take place in a double belt press so the glass flake insulating sheet is taken to the b-stage in a compacted state.

During production, the insulating sheet is dried and then subjected to a heat treatment above the bonding resin's fusion/cure temperature. These operations can be accomplished in several ways. Drying can be accomplished by passing the wet sheet over conventional can dryers or through a air-through oven. The fusing operation can be accomplished in three ways.

1. The insulating sheet can be consolidated and fused or cured by passage through a hot calendar at a temperature and pressure appropriate for the bonding resin. For example, utilizing a single nip laminating calendar and a polyolefin floc bonding agent a temperature of 180° to 21 0° F. and a pressure of 40 to 80 psi would be appropriate.
2. The bonding agent can be raised to its flow or cure temperature in a air-through oven as the final step in the drying operation. If a thermoset resin is used, this technique precludes further consolidation.
3. The dried insulating sheet can be consolidated and fused or cured by passage through a double belt press using temperatures and pressures appropriate for the bonding resin. In the case of thermoplastic bonding agents, a double belt press equipped with a cooling zone is preferred. As an example, with a polyolefin floc bonding agent consolidation and fusing occurs at a temperature of 285° F. and a pressure of 60 psi.

In an example embodiment of the invention, the insulating sheet material can be reinforced by incorporating discrete fibers. Suitable materials for the fibers include poly [1,3-phenyleneisophthalimide] (available from DuPont under the trade name Nomex®) and poly [1,4-phenyleneisophthalamide] (available from DuPont under the trade name Kevlar®, E-glass and D-glass (which is more expensive). Other possible fiber materials include other materials that have good dielectric properties and are thermostable under the hot calendaring conditions described above. The fibers should be 0.1–1.0 inches in length, more typically 0.3–0.6 inches. Organic fibers should have a diameter of 10 to 20 microns and preferably 14 to 15 microns. Glass fibers should have diameter of 6 to 11 microns preferably 7 to 8 microns.

In another example, embodiment of the invention unidirectional continuous yarn reinforcements can be incorporated into the insulating sheet. The preferred materials for these continuous reinforcements are the same as for discrete fiber reinforcements. The continuous yarn reinforcements can take the form of a scrim, open fabric or multiple unidirectional yarns inserted in the machine direction of the insulation sheet. It will be understood by those familiar with the art that many scrims or open face fabrics are available with various cost/performance points. A fabric that has proven useful but not necessarily optimum is an E-glass fabric style 1070 available commercially from Burlington Glass Fabrics (BGF). The fabric/scrim can be introduced during the manufacture of the insulating sheet or laminated to an already formed sheet in a post formation laminating step preferably in conjunction with the consolidation fusing operation. Alternately, a plurality of parallel yarns can be injected into the forming zone of the paper machine during the formation of the insulating sheet. The spacing of the continuous yarns is dependent on the ultimate strength of the yarn, the width of tape to be cut from the insulating sheet, and the strength requirements for the tape. As an example, D-900 E-glass yarn incorporated into the sheet at ½" intervals would produce an acceptable insulating sheet.

To prepare the insulating sheet material, the D-glass flake and selected additives, e.g. fibrids, floc, and fibers, are mixed with water to produce a dilute slurry. The slurry may then be processed through a standard flat wire Fourdrinier machines, inclined wire Fourdrinier machine or other suitable papermaking machine to form the sheet. The formed sheet is then dried on conventional can dryers or by passage through an air-through oven. The dried sheet is then consolidated and fused or cured in an in-line or off-line operation as described previously. The insulating sheet material is generally created as a continuous sheet and stored as a roll.

If the insulating sheet includes discrete fibers as described above, then the sheet will generally be finished when it emerges from the papermaking machine and consolidation/fuse/cure operation. If the insulating sheet does not include the discrete fibers, then the sheet will be reinforced with continuous yarns in the form of a fabric/scrim or a plurality of continuous yarns. The continuous yarn reinforcement provides additional tensile strength to the insulating sheet for subsequent winding onto an electrical component. The reinforcement/backing may be added to the insulating sheet either in the papermaking machine or in a separate step after the sheet emerges from the machine. If added during sheet formation, the continuous reinforcement provides wet strength to the sheet, which enhances processability. While the reinforcement backing is generally used with the fiberless insulating sheet, the fiberglass backing may of course be used with the fiber-containing sheet if additional tensile strength is required.

In a less preferred embodiment of the invention, the insulating sheet does not contain the fibers or the floc. This embodiment comprises the D-glass flake and the fibrids as described above. While this embodiment has good dielectric properties, its tensile strength and wet strength are low.

In another less preferred embodiment of the invention, the insulating sheet does not contain the fibers or the fibrids. This embodiment comprises the D-glass flake and the floc as described above. While this embodiment has good dielectric properties, its tensile strength and porosity is low. The lowered porosity results in an insulating sheet which is harder to saturate.

EXAMPLE

Three runs of D-glass Flake Paper were produced for testing. The paper was made up of:

93.65% D-glass flake (sieve distribution −80, +200 mesh)
1.4% Nomex® Fibrids
2.2% EST 8 polyolefin floc
2.75% ½"×2 dpf Nomex® fibers The dielectric constant and dissipation factor of the glass flake paper was measured and compared against three samples of KM 160XL Mica Paper, available from Isola-Volta. Three 3.0"×3.0" samples of each were tested. The samples were tested in a test cell using two different test fluids. The test specimens were conditioned for 40 hours at laboratory ambient temperature. The test cell was filled with the first fluid to approximately 90% capacity. Using clean tweezers, the specimen to be tested was carefully inserted between the plates of the test cell, and the test cell was then placed in a vacuum chamber for 5 minutes to remove any trapped air.

After removal from the vacuum chamber, leads were then plugged into connectors in the cell to create a test circuit, and the test circuit was tuned. The capacitance of the liquid cell with the specimen, as well as the dissipation factor of the fluid with specimen, were determined. The specimen was removed and the capacitance and the dissipation factor of the liquid alone was recorded. The procedure above was followed for the second fluid.

The Dielectric Constant was calculated using the following formula:

$$\text{Dielectric Constant} = K_x = \frac{K_3 K_2 C_2 C_{2x} \Delta C_3 - K_3 K_2 C_3 C_{3x} \Delta C_3}{K_3 C_2 C_{2x} \Delta C_3 - K_2 C_3 C_{3x} \Delta C_2}$$

Where:

Kx=Dielectric Constant of specimen $K_2$=Dielectric Constant of first liquid $K_3$=Dielectric Constant of second liquid $\Delta C_2$=the change in capacitance on insertion of the specimen into the first liquid $\Delta C_3$=the change in capacitance on insertion of the specimen into the second liquid $C_{2x}$=the measured capacitance of the first liquid $C_{3x}$=the measured capacitance of the second liquid The test equipment used complied with the calibration test procedures of ISO 10012-1, ANSIINCSL Z540-1-1994, and MIL-STD-45662A, and the data reported is accurate within the tolerance limitation of the equipment used.

The measured results were as follows:

| Material | Dielectric Constant | Dissipation Factor |
|---|---|---|
| D-Glass Flake Paper | | |
| Sample 1 | 2.72 | 0.0013 |
| Sample 2 | 2.78 | 0.0013 |
| Sample 3 | 2.71 | 0.0014 |
| Average | 2.74 | 0.0013 |
| KM160XL Mica Paper | | |
| Sample 1 | 3.56 | 0.0024 |
| Sample 2 | 3.66 | 0.0015 |
| Sample 3 | 3.50 | 0.0020 |
| Average | 3.57 | 0.0020 |

Although the preferred embodiments of the invention have been shown and described, it should be understood that various modifications and changes may be resorted to without departing from the scope of the invention as disclosed and claimed herein.

What is claimed is:

1. An electrical insulating sheet comprising 50–99% D-glass flakes and 1–50% additives.

2. An electrical insulating sheet according to claim 1, where the additive comprises 1–30% bonding agent.

3. An electrical insulating sheet according to claim 2, said electrical insulating sheet further comprising 1–20% discrete reinforcing fibers.

4. An electrical insulating sheet according to claim 3, said sheet further comprising continuous reinforcing yarns in the form of a fabric, scrim or plurality of parallel yarns.

5. An electrical insulating sheet according to claim 4, wherein said continuous reinforcing yarns are made of a material selected from a group consisting of poly [1,3-phenyleneisophthalamide], poly [1,4-phenyleneisophthalamide], polyester, E-glass, and D-glass.

6. An electrical insulating sheet according to claim 3, wherein said fibers are made of a material selected from the group consisting of poly [1,3-phenyleneisophthalamide], poly [1,4-phenyleneisophthalamide], polyester, E-glass, and D-glass.

7. An electrical insulating sheet according to claim 3, wherein the reinforcing fibers are 0.1–1.0 inches long.

8. An electrical insulating sheet material according to claim 3, wherein the bonding agent is a polyolefin.

9. An electrical insulating sheet according to claim 2, said electrical insulating sheet further comprising 1–45% porosity control agent.

10. An electrical insulating sheet according to claim 9, said electrical insulating sheet further comprising 1–20% discrete reinforcing fibers.

11. An electrical insulating sheet according to claim 10, said sheet further comprising continuous reinforcing yarns in the form of a fabric, scrim, or plurality of parallel yarns.

12. An electrical insulating sheet according to claim 11, wherein said continuous reinforcing yarns are made of a material selected from a group consisting of poly [1,3-phenyleneisophthalamide], poly [1,4-phenyleneisophthalamide], polyester, E-glass, and D-glass.

13. An electrical insulating sheet according to claim 10, wherein said fibers are made of a material selected from a group consisting of poly [1,3-phenyleneisophthalanide], poly [1,4-phenyleneisophthalamide], polyester, E-glass, and D-glass.

14. An electrical insulating sheet according to claim 9, said sheet further comprising continuous reinforcing yarns in the form of a fabric, scrim, or plurality of parallel yarns.

15. An electrical insulating sheet according to claim 14, wherein said continuous reinforcing yarns are made of a material selected from a group consisting of poly [1,3-phenyleneisophthalamide], poly [1,4-phenyleneisophthalamide], polyester, E-glass, and D-glass.

16. An electrical insulating sheet according to claim 2, said sheet further comprising continuous reinforcing yarns in the form of a fabric, scrim, or plurality of parallel yarns.

17. An electrical insulating sheet according to claim 16, wherein said continuous reinforcing yarns are made of a material selected from a group consisting of poly [1,3-phenyleneisophthalamide], poly [1,4-phenyleneisophthalamide], polyester, E-glass, and D-glass.

18. An electrical insulating sheet material according to claim 2, wherein the bonding agent is a thermoplastic resin.

19. An electrical insulating sheet material according to claim 2, wherein the bonding agent is a polyolefin.

20. An electrical insulating sheet according to claim 1, where the additive comprises 1–45% porosity control agent.

21. An electrical insulating sheet according to claim 20, said sheet further comprising continuous reinforcing yarns in the form of a fabric, scrim, or plurality of parallel yarns.

22. An electrical insulating sheet according to claim 21, wherein said continuous reinforcing yarns are made of a material selected from a group consisting of poly [1,3-phenyleneisophthalamide], poly [1,4-phenyleneisophthalamide], polyester, E-glass, and D-glass.

23. An electrical insulating sheet according to claim 20, wherein the porosity control agent comprise fibrids composed of poly [1,3-phenylene isophthalamide].

24. An electrical insulating sheet according to claim 20, wherein the porosity control agents are thermostable at temperatures greater than the flow temperature of the bonding agent.

25. An electrical insulating sheet according to claim 1, wherein the D-glass flakes are 2–12 microns thick.

26. An electrical insulating sheet according to claim 1, wherein the D-glass flakes are 3–8 microns thick.

27. An electrical insulating sheet according to claim 1, wherein the D-glass flakes are 4–7 microns thick.

28. An electrical insulating sheet according to claim 1, wherein the D-glass flakes are 50–250 microns in diameter.

29. A method of making electrical insulating sheet material, comprising creating a slurry, the slurry comprising water, D-glass flakes, and selected additives, and forming a sheet from the slurry.

30. A method of making electrical insulating sheet material according to claim 29, wherein the slurry further comprises particles of a bonding agent.

31. A method of making electrical insulating sheet material according to claim 30, wherein the slurry further comprises reinforcing fiber.

32. A method of making electrical insulating sheet material according to claim 30, further comprising a step of hot consolidating and fusing/curing the bonding agent within the electrical insulating sheet under a pressure and temperature above the flow/cure temperature of the bonding agent.

* * * * *